US012572989B2

(12) United States Patent
Takahashi

(10) Patent No.: US 12,572,989 B2
(45) Date of Patent: Mar. 10, 2026

(54) POWER MANAGEMENT SYSTEM

(71) Applicant: TOYOTA JIDOSHA KABUSHIKI KAISHA, Toyota (JP)

(72) Inventor: Tomoya Takahashi, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 750 days.

(21) Appl. No.: 18/085,064

(22) Filed: Dec. 20, 2022

(65) Prior Publication Data

US 2023/0281731 A1     Sep. 7, 2023

(30) Foreign Application Priority Data

Mar. 4, 2022     (JP) ................................. 2022-033459

(51) Int. Cl.
| | |
|---|---|
| *H02J 7/00* | (2006.01) |
| *B60L 55/00* | (2019.01) |
| *G06Q 50/06* | (2012.01) |
| *H02J 3/32* | (2006.01) |

(52) U.S. Cl.
CPC .............. *G06Q 50/06* (2013.01); *B60L 55/00* (2019.02); *H02J 3/322* (2020.01)

(58) Field of Classification Search
None
See application file for complete search history.

(56) References Cited

U.S. PATENT DOCUMENTS

| | | | |
|---|---|---|---|
| 2014/0267712 A1* | 9/2014 | Foerster | G08B 13/19695 |
| | | | 340/568.3 |
| 2018/0194238 A1 | 7/2018 | Tsuchiya | |
| 2021/0039518 A1 | 2/2021 | Nakamura | |
| 2022/0402390 A1* | 12/2022 | Smolenaers | H02J 3/322 |

FOREIGN PATENT DOCUMENTS

| | | |
|---|---|---|
| JP | 2021-027721 | 2/2021 |

* cited by examiner

*Primary Examiner* — Arun C Williams
(74) *Attorney, Agent, or Firm* — Finnegan, Henderson, Farabow, Garrett and Dunner, LLP

(57) ABSTRACT

A power management system manages power transmitted between a VPP connected to a power network installed in a predetermined area and the power network. The VPP includes vehicles each including a power storage device that is chargeable by receiving power from the power network. A server of the power management system acquires the state of a relay for each of the vehicles. When number of on times that the relay is brought from a disconnected state to a connected state is more than a first value in a case that the power storage device is charged in a target vehicle in accordance with a request for an increase in amount of power demanded in the power network, the server instructs the target vehicle to maintain the relay in the connected state until a charge process executed in accordance with the request is completed.

9 Claims, 8 Drawing Sheets

POWER MANAGEMENT SYSTEM

CROSS-REFERENCE TO RELATED APPLICATION

This application claims priority to Japanese Patent Application No. 2022-033459 filed on Mar. 4, 2022, incorporated herein by reference in its entirety.

BACKGROUND

1. Technical Field

The present disclosure relates to a power management system.

2. Description of Related Art

There has hitherto been known a virtual power plant (VPP) in which small-scale energy resources such as power storage devices mounted on electrified vehicles parked at a factory or a house are controlled remotely and integrally using a server etc. so that the energy resources function as if they were a single power plant. In the VPP, a power demand can be leveled by varying the amount of power demanded in a power network, by charging and discharging the in-vehicle power storage devices connected to the power network, for example. When a request to increase the amount of power demanded in the power network (i.e. an increase demand response (DR)) is received, for example, the amount of power demanded can be increased by charging the in-vehicle power storage devices connected to the power network.

Each of such electrified vehicles is provided with a switching device such as a relay for switching between a state in which the electric vehicle can supply and receive power to and from the power network and a state in which electric connection with the power network is blocked. Japanese Unexamined Patent Application Publication No. 2021-027721 (JP 2021-027721 A), for example, discloses a technique of prohibiting switching operation performed in accordance with transactions related to power when the number of times of switching a relay from one of an open state and a closed state to the other becomes more than a threshold value.

SUMMARY

When switching operation performed in accordance with transactions related to power is unconditionally prohibited when the number of times of switching becomes more than the threshold value, however, the vehicles may not be able to participate in a DR request in the VPP after that. As a result, the number of vehicles that participate in a DR request may be decreased, and the DR request may not be handled responsively. In vehicles (V1G vehicles) in which an in-vehicle power storage device can only be charged externally using power from an external power network, in particular, the number of times of switching of a relay may be increased more than expected by handling a DR request, compared to vehicles (V2G vehicles) that can supply and receive power to and from an external power network. Therefore, it is desired to suppress an increase in the number of times of switching of a relay for vehicles that can participate in a DR request.

The present disclosure provides a power management system that suppresses an increase in the number of times of switching of a relay that switches the state of connection between a power network and an in-vehicle power storage device.

An aspect of the present disclosure provides a power management system that manages power transmitted between a virtual power plant (VPP) connected to a power network installed in a predetermined area and the power network. The VPP includes a plurality of vehicles each of which is configured to be connectable to and disconnectable from the power network via a relay, a power storage device that is chargeable by receiving the power supplied from the power network being mounted on each of the plurality of vehicles. The power management system includes a server that is able to communicate with the vehicles. The server acquires a state of the relay of each of the vehicles. When number of on times that the relay is brought from a disconnected state to a connected state is more than a first value in a case that the power storage device is charged by receiving the power supplied from the power network in a target vehicle, among the vehicles, in accordance with a request for an increase in an amount of the power demanded in the power network, the server instructs the target vehicle to maintain the relay in the connected state until a charge process executed in accordance with the request is completed.

With this configuration, when the charge process is executed in accordance with a request to increase the amount of power demanded, the relay is maintained in the connected state until the charge process is completed. Therefore, it is possible to complete charge of the power storage device and suppress an increase in the total number of on times. Consequently, it is possible to suppress degradation of the relay when the target vehicle is used as a part of the VPP.

In the power management system according to the above aspect, a period in which the charge process is executed may include a period in which charge of the power storage device is suspended.

With this configuration, the relay is maintained in the connected state in the period in which the charge process is executed in accordance with the request, including the period in which charge of the power storage device is suspended. Thus, it is possible to suppress an increase in the total number of on times of the relay.

In the power management system according to the above aspect, each of the vehicles may include a control device that controls the relay such that a continuation time, in which the relay is continuously kept in the connected state during execution of the charge process, is not less than a second value.

With this configuration, the relay is controlled such that the continuation time of the connected state of the relay is not less than the second value. Thus, it is possible to suppress the relay being turned on and off at intervals that are less than the second value. Therefore, it is possible to suppress an increase in the total number of on times of the relay.

In the power management system according to the above aspect, when a last charge time is more than a third value, the control device may set the second value to be a value less than the second value when the last charge time is less than the third value.

With this configuration, an increase in the total number of on times of the relay is suppressed when the last charge time is long, and it is possible to stop the charge process responsively in response to a request by reducing the second value.

In the power management system according to the above aspect, the server may set at least one of the first value and the second value using charge power in the charge process.

With this configuration, it is possible to stop the charge process responsively in response to a request while suppressing an increase in the total number of on times of the relay, by setting the first value or the second value that matches the charge power in the charge process.

In the power management system according to the above aspect, the server may select, among the vehicles, a vehicle of which the number of on times is more than a fourth value, as a vehicle that adjusts the amount of power demanded using a reserve determined in advance. The reserve determined in advance may include a reserve, among a plurality of reserves with different reaction times for adjusting the amount of the power demanded in accordance with the request, with a reaction time being longer than any other of the different reaction times.

With this configuration, when the amount of power demanded is adjusted using a reserve with a long reaction time, the frequency at which the relay is turned on is occasionally lower than when the amount of power demanded is adjusted using continuation time with a short reaction time. Therefore, by selecting a vehicle which the number of on times is more than a fourth value, as a vehicle that adjusts the amount of power demanded using a reserve determined in advance, it is possible to suppress an increase in the total number of on times of the relay of the vehicle.

In the power management system according to the above aspect, the server may select, among the vehicles, a vehicle that is allowed to bring the relay into the disconnected state during a period in which the charge process is executed, using the number of on times.

With this configuration, it is possible to suppress an increase in the total number of on times of the relay of a specific vehicle among the vehicles.

In the power management system according to the above aspect, the server may select a vehicle in which a magnitude of a difference between charge power in the charge process and last charge power is equal to or less than a threshold value, as a vehicle of which the relay is maintained in the connected state until the charge process is completed.

With this configuration, it is possible to suppress an increase in the total number of on times of the relay by maintaining the relay in the connected state until the charge process is completed in a vehicle in which the charge power in the charge process executed in accordance with a request is not fluctuated significantly compared to the last charge power.

In the power management system according to the above aspect, the vehicles may include one or more V1G vehicles that unilaterally receive power supplied from the power network. The server may select a V1G vehicle in which the magnitude of the difference between the charge power in the charge process and the last charge power is equal to or less than the threshold value, as a vehicle of which the relay is maintained in the connected state until the charge process is completed.

With this configuration, it is possible to suppress an increase in the total number of on times of the relay by maintaining the relay in the connected state until the charge process is completed in the V1G vehicle which the charge power in the charge process executed in accordance with a request is not fluctuated significantly compared to the last charge power.

With the present disclosure, a power management system that suppresses an increase in the number of times of switching of a relay that switches the state of connection between a power network and an in-vehicle power storage device is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
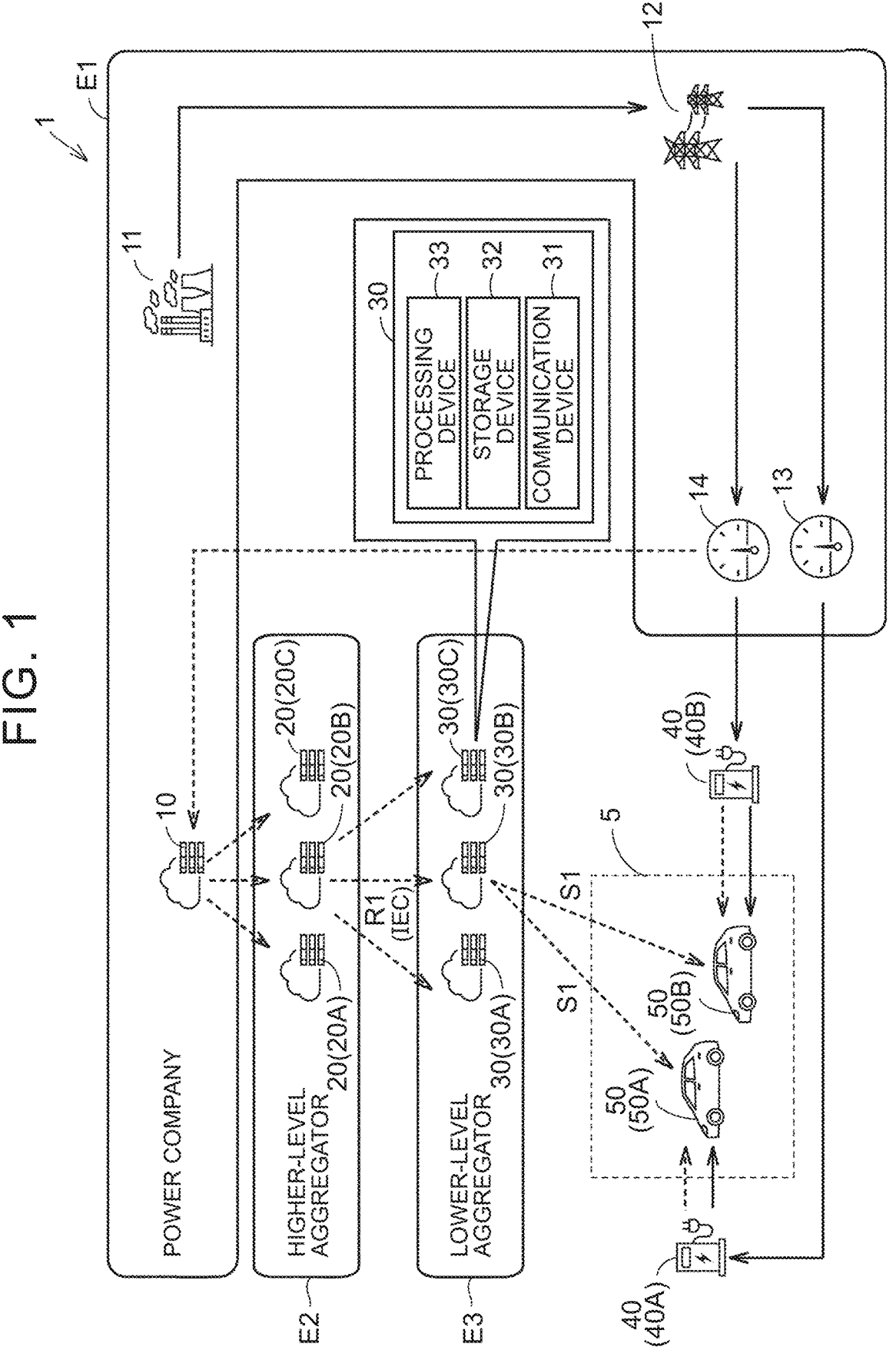
FIG. 1 illustrates a schematic configuration of a power management system according to the present embodiment.

An embodiment of the present disclosure will be described in detail below with reference to the drawings. In the drawings, like or corresponding portions are given like signs to omit repeated description thereof.

FIG. 1 illustrates a schematic configuration of a power management system 1 according to the present embodiment. In the present embodiment, the power management system 1 has a function of a virtual power plant (VPP). The VPP is an arrangement in which a large number of distributed energy resources (hereinafter also referred to as "DERs") are bundled through an advanced energy management technology that uses Internet of Things (IoT), and in which the DERs are controlled remotely and integrally so that the DERs function as if they were a single power plant. The function of the VPP through energy management that uses electrified vehicles is implemented in the power management system 1.

The power management system 1 is a vehicle grid integration (VGI) system. The power management system 1 includes a vehicle group 5 constituted from a plurality of electrified vehicles (hereinafter referred to simply as "vehicles") 50 and a plurality of electric vehicle supply equipment (EVSEs) 40. The respective numbers of the vehicles 50 and the EVSEs 40 included in the power management system 1 are not specifically limited. The vehicles 50 may include at least either privately owned vehicles (POVs) or mobility-as-a-service (MaaS) vehicles. The POVs are each a vehicle owned by an individual. The MaaS vehicles are each a vehicle managed by a MaaS business operator. The EVSEs 40 may include at least either non-public EVSEs (e.g. EVSEs for home use) that can be used by only specific users or public EVSEs that can be used by a large number of unspecified users. Power storage devices are mounted on the vehicles 50

The power management system 1 includes a power company E1. The power company E1 serves as both a power generation business operator and a power transmission/distribution business operator. The power company E1 constructs a power network using a power plant 11 and power transmission/distribution equipment 12, and maintains and manages the power network using a server 10. The power plant 11 includes a power generation device that generates electricity, and is configured to supply power generated by the power generation device to the power transmission/distribution equipment 12. The power plant 11 may use any method of power generation. The method of power generation by the power plant 11 may be any of thermal power generation, hydroelectric power generation, wind power generation, nuclear power generation, and photovoltaic power generation. The power transmission/distribution equipment 12 includes power transmission lines, substations, and power distribution lines, and is configured to transmit and distribute power supplied from the power plant 11. Smart meters 13 and 14 are each configured to measure the amount of power used for every predetermined time (e.g. every 30 minutes), store the measured amount of power used, and transmit the measured amount of power used to the server 10. The smart meters 13 and 14 are provided to each consumer (e.g. an individual or a company) that uses power. The server 10 acquires the amount of power used by each consumer from the smart meter 13, 14 of the consumer. The power company E1 may receive an electricity charge that matches the amount of power used from each consumer. The server 10 is configured to be able to communicate with servers 20 included in a higher-level aggregator E2. In this embodiment, the power company E1 corresponds to the manager of the power network.

The power management system 1 further includes the higher-level aggregator E2 and a lower-level aggregator E3. Power business operators that bundle the DERs and provide an energy management service are referred to as "aggregators". The power company E1 can adjust power in the power network by cooperating with the aggregators, for example.

The higher-level aggregator E2 includes a plurality of servers (e.g. servers 20A, 20B, and 20C). The servers included in the higher-level aggregator E2 belong to different business operators. The lower-level aggregator E3 includes a plurality of servers (e.g. servers 30A, 30B, and 30C). The servers included in the lower-level aggregator E3 belong to different business operators.

Hereinafter, the servers included in the higher-level aggregator E2 will be referred to as "servers 20", and the servers included in the lower-level aggregator E3 will be referred to as "servers 30", except when such servers are differentiated from each other. The respective numbers of the servers 20 and the servers 30 are not specifically limited.

In this embodiment, one server 10 requests the plurality of servers 20 for energy management, and each of the servers 20 that have been requested from the server 10 requests the plurality of servers 30 for energy management. Further, each of the servers 30 that have been requested from the servers 20 requests a plurality of DER users for energy management. The power company E1 can request a large number of consumers (e.g. vehicle users) for energy management using such a hierarchical structure (tree structure). Requests may be made using demand responses (DRs), for example.

When a server 30 receives a request for energy management from a server 20, the server 30 selects one or more DERs for meeting the request, from among the DERs registered in the server 30. Hereinafter, the thus selected one or more DERs will occasionally be referred to as "EMDERs". The EMDER may include an in-vehicle battery, or may include a stationary battery.

The server 30 performs energy management for an area under the responsibility thereof. The area under the responsibility of the server 30 is a region determined in advance, and may be a region including a town (e.g. a smart city), a region including a factory, or a region including a university campus, for example. The lower-level aggregator E3 makes a contract related to energy management with users of the DERs that are present in the area under the responsibility of the server 30. The users that have made this contract can receive a predetermined incentive by causing the DERs to perform energy management in accordance with a request from the lower-level aggregator E3. The users that have agreed to follow the request but that have failed to follow the request are subjected to a predetermined penalty as determined by the foregoing contract. The DERs and the users that have been given the duty to perform energy management by the contract are registered in the server 30.

After selecting the EMDER(s) described above, the server 30 transmits an instruction to the EMDER(s). This instruction causes energy management (e.g. demand/supply adjustment in the power network) to be executed in accordance with the request from the server 20. The server 30 is a computer that includes a communication device 31, a storage device 32, and a processing device 33, for example.

The communication device 31 is configured to be able to communicate with an external device (e.g. the server 20 and the vehicle 50) through a predetermined communication method (e.g. wirelessly or through a wire).

The storage device 32 includes a memory such as a read only memory (ROM) and a random access memory (RAM). The ROM stores a program to be executed by the processing device 33. The RAM functions as a working memory for processing by the processing device 33.

The processing device 33 includes a processor such as a central processing unit (CPU). The processing device 33 executes various processes by executing the program stored in the storage device 32.

The processing device 33 receives a request signal R1 from the server 20 of the higher-level aggregator E2 via the communication device 31, for example.

The request signal R1 includes one of information for requesting the servers 30 of the lower-level aggregator E3 to increase (hereinafter referred to as an "increase DR") the amount of power demanded by increasing the amount of power consumed in the power network, and information for requesting the servers 30 of the lower-level aggregator E3 to decrease (hereinafter referred to as a "reduction DR") the amount of power demanded by increasing the amount of power supplied to the power network. The request signal R1 includes information IEC that indicates a target amount of power to be consumed, that is, the amount of power that needs to be consumed in the power network while the DR is performed.

When the request signal R1 including information requesting an increase DR is received via the communication device 31, for example, the processing device 33 transmits a DR signal S1 including information requesting the vehicle 50 as a power resource for an increase DR.

Figure 2:
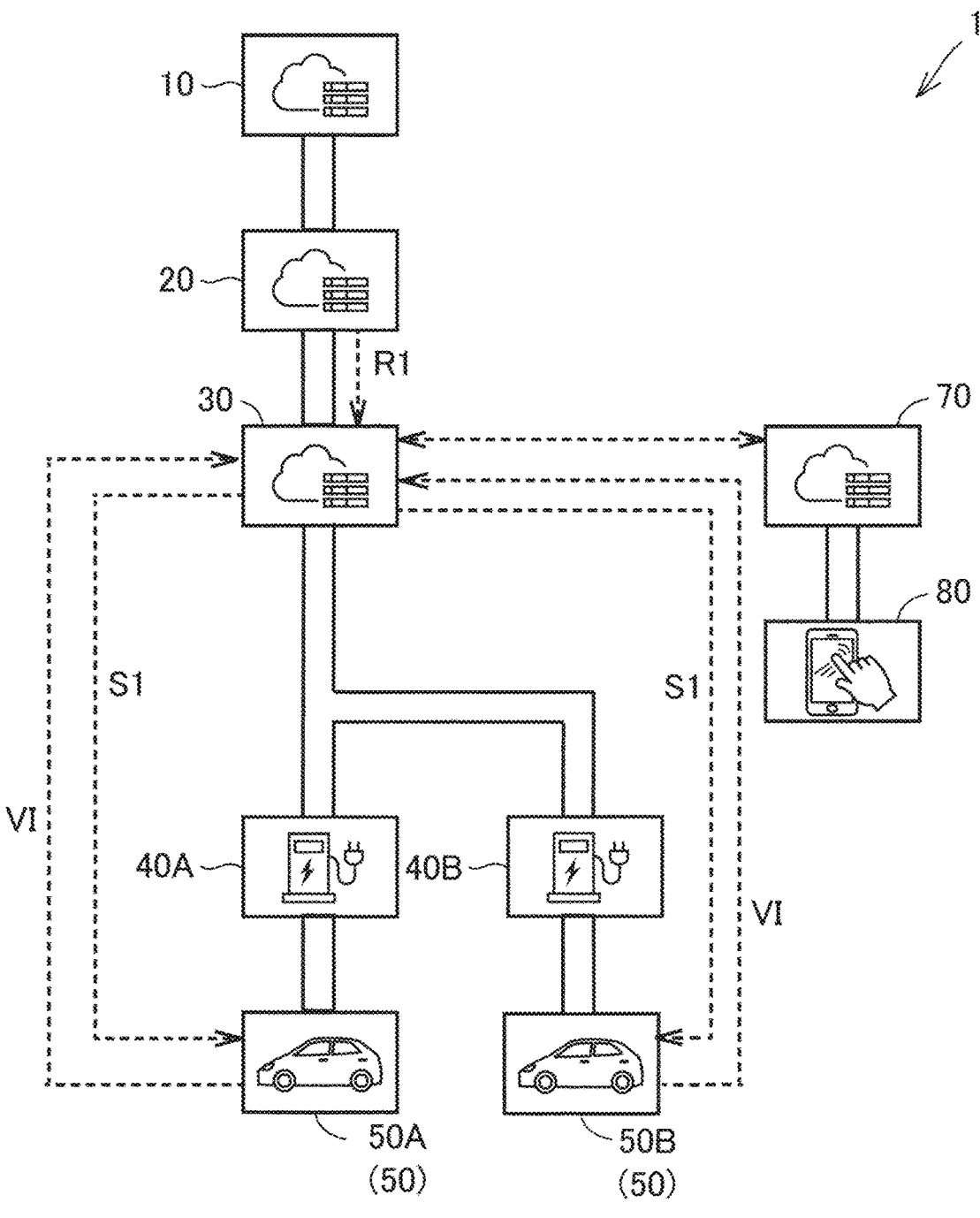
FIG. 2 is a diagram illustrating a communication system of the power management system.

The vehicle 50 is a battery electric vehicle on which a power storage device and a relay are mounted. It is assumed that the user of the vehicle 50 has made a contract with the lower-level aggregator E3 beforehand to be able to participate in a DR in which the vehicle 50 is used. While FIGS. 1 and 2 illustrate a case where the vehicle group 5 includes two vehicles 50A, 50B by way of example, the number of the vehicles 50 in the vehicle group 5 is not limited to two.

The server 30 measures the power adjustment amount (e.g. the amount of power charged and/or the amount of power discharged in a predetermined period) for each EMDER using a predetermined watt-hour meter. The power adjustment amount may be used to calculate the incentive. The predetermined watt-hour meter may be the smart meter 13 or 14, or may be a watt-hour meter mounted on the vehicle 50A, 50B. The watt-hour meter may be installed at any location. The watt-hour meter may be built in an EVSE 40A, 40B. The watt-hour meter may be attached to a portable charge cable.

In this embodiment, the server 30 is configured to receive respective detection values of the smart meters 13 and 14 from the server 10. However, this is not limiting, and the server 30 may be configured to acquire respective detection values of the smart meters 13 and 14 directly (not via the server 10).

The smart meter 13 is configured to measure the amount of power transmitted between the power network constructed by the power plant 11 and the power transmission/distribution equipment 12 and the EVSE 40A. The vehicle 50A is connected to the EVSE 40A. The server 30B is configured to be able to communicate with the vehicle 50A.

The smart meter 14 measures the amount of power transmitted between the power network and the EVSE 40B. The vehicle 50B is connected to the EVSE 40B. The server 30B is configured to be able to communicate with the vehicle 50B.

When the server 30B receives the request signal R1 from the server 20, for example, the server 30B performs energy management through charge of the in-vehicle battery by transmitting a charge start instruction to the vehicle 50A connected to the EVSE 40A. When the server 30B receives the request signal R1 from the server 20, the server 30B performs energy management through charge of the in-vehicle battery by transmitting the DR signal S1 including a charge start instruction to the vehicle 50B connected to the EVSE 40B, or performs energy management through power supply from the in-vehicle battery to the power network by transmitting the DR signal S1 including a power supply start instruction to the vehicle 50B. The server 30B acquires a state of charge (SOC) of the in-vehicle battery during execution of energy management from the vehicle 50A or the vehicle 50B.

FIG. 2 is a diagram illustrating a communication system of the power management system 1. With reference to FIG. 2, the power management system 1 further includes a data center 70 and a portable terminal 80.

The data center 70 is configured to communicate with the server 30 via the Internet, for example. The data center 70 is configured to manage information on a plurality of portable terminals (e.g. smartphones) 80. The information on the portable terminals 80 is registered in the data center 70, and includes information related to the vehicles 50 of the users that own the portable terminals 80. This information includes vehicle IDs of the vehicles 50, and travel schedules of the vehicles 50 including an expected departure time of the vehicles 50, for example. The information registered in the data center 70 is transmitted to the server 30.

The server 10 of the power company E1 transmits a signal for requesting the higher-level aggregator E2 to participate in a DR to each server 20 when the power supply-demand balance is to be adjusted, for example. This signal includes information on a region to be a target for the DR and a period for which the DR is to be performed, for example.

When the signal is received from the server 10, each server 20 of the higher-level aggregator E2 transmits a request signal R1 to the servers 30 of the lower-level aggregator E3.

When the request signal R1 is received from the server 20 of the higher-level aggregator E2, the servers 30 of the lower-level aggregator E3 allocate a DR amount to each vehicle 50 that can participate in the DR, among the vehicles 50 under the responsibility of the lower-level aggregator E3. In this example, the DR amount for the vehicle 50 indicates the transmission amount of power that the vehicle 50 is requested for. Then, the servers 30 transmit a DR signal S1 to each vehicle 50. The DR signal S1 includes information on an ID (vehicle ID) of the vehicle 50 as a target for transmission of the signal, the DR amount for the vehicle 50, the DR period, and control for a charge relay 58. The vehicle ID, the DR amount, and the DR period may be stored in the storage device 32 of the server 30 as DR information.

When the DR signal S1 is received, the vehicle 50 transmits vehicle information VI that indicates the state of the vehicle 50 to the server 30. The vehicle information VI includes the vehicle ID, SOC information on a power storage device 110, and information such as the travel schedule (including the expected departure time) of the vehicle 50, for example. The vehicle information VI further includes information (participation possibility information) that indicates whether it is possible to participate in a request for a DR which is to be discussed later, information that indicates the open-close state of the charge relay 58, and information that indicates an open-close history of the charge relay 58, for example.

Figure 3:
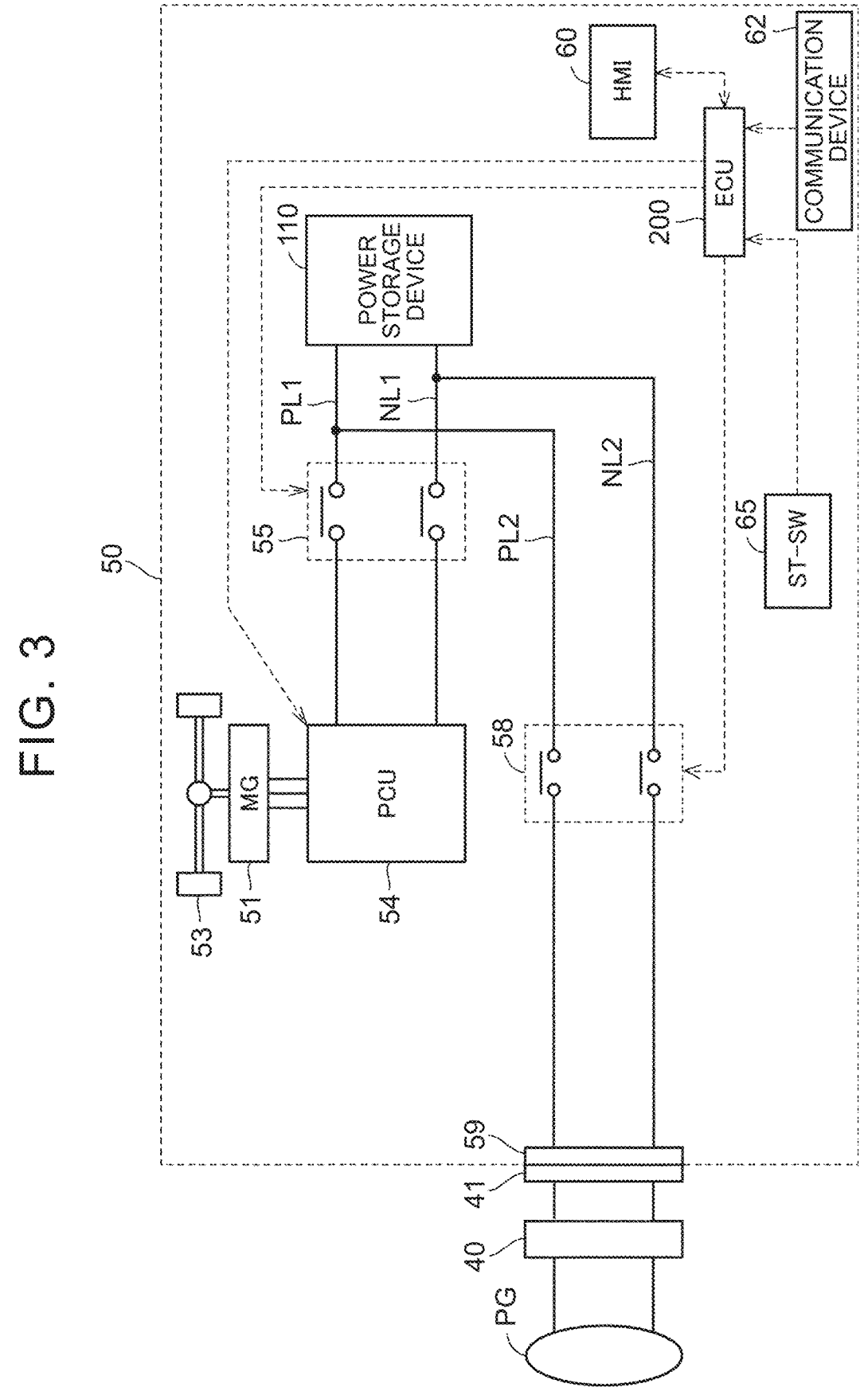
FIG. 3 illustrates an example of a detailed configuration of a vehicle.

FIG. 3 illustrates an example of a detailed configuration of the vehicle 50. With reference to FIG. 3, the vehicle 50 includes a motor generator (MG) 51, drive wheels 53, a power control unit (PCU) 54, a system main relay (SMR) 55, the charge relay 58, an inlet 59, a human machine interface (HMI) device 60, a communication device 62, a start switch 65, the power storage device 110, and an electronic control unit (ECU) 200.

The MG 51 is a three-phase alternating current (AC) motor generator, for example. The MG 51 is driven by the PCU 54 to generate a travel drive force of the vehicle 50. The vehicle 50 travels with the travel drive force transmitted to the drive wheels 53 via a power transmission gear. Alternatively, the MG 51 generates AC power during regenerative braking, and supplies the generated power to the PCU 54. The PCU 54 converts the AC power into direct current (DC) power, and outputs the DC power to the power storage device 110.

The PCU 54 converts power from the power storage device 110 and outputs the converted power to the MG 51 to drive the vehicle 50, and converts power input from the MG 51 during regenerative braking and outputs the converted power to the power storage device 110 to charge the power storage device 110.

The SMR 55 is configured to be able to open and close in accordance with a control signal received from the ECU 200. The SMR 55 is provided in power lines PL1, NL1, and switches the state of electrical connection between the power storage device 110 and the PCU 54. The power line PL1 is a positive electrode line that connects between the positive electrode terminal of the power storage device 110 and the positive electrode terminal of the PCU 54. The power line NL1 is a negative electrode line that connects between the negative electrode terminal of the power storage device 110 and the negative electrode terminal of the PCU 54. When the SMR 55 is brought into the closed state, the power storage device 110 and the PCU 54 are connected to each other. When the SMR 55 is brought into the open state, meanwhile, the power storage device 110 and the PCU 54 are disconnected from each other.

The charge relay 58 is configured to be able to open and close in accordance with a control signal received from the ECU 200. The charge relay 58 is provided in power lines PL2, NL2. One end of the power line PL2 is connected to a position on the power line PL1 between the SMR 55 and the power storage device 110. The other end of the power line PL2 is connected to the positive electrode terminal of the inlet 59. One end of the power line NL2 is connected to a position on the power line NL1 between the SMR 55 and the power storage device 110. The other end of the power line NL2 is connected to the negative electrode terminal of the inlet 59. The charge relay 58 switches the state of electrical connection between the power storage device 110 and the inlet 59. When the charge relay 58 is brought into the closed state, the power storage device 110 and the inlet 59 are connected to each other. When the charge relay 58 is brought into the open state, meanwhile, the power storage device 110 and the inlet 59 are electrically disconnected from each other.

The inlet 59 is structured such that a connector 41 connected to the EVSE 40 is attachable thereto. When the connector 41 is attached to the inlet 59, a contact point (not illustrated) provided in the inlet 59 and a contact point (not illustrated) provided in the connector 41 abut against each other so that the EVSE 40 and the inlet 59 are electrically connected to each other. The EVSE 40 converts AC power from a power network PG into DC power, and enables supply of the power to the vehicle 50 by way of the connector 41.

When the connector 41 is attached to the inlet 59 and the charge relay 58 is in the closed state, the power storage device 110 and the power network PG are electrically connected to each other by way of the inlet 59, the connector 41, and the EVSE 40, and therefore the vehicle 50 can be charged externally. When the charge relay 58 is in the open state, on the other hand, the power storage device 110 and the power network PG are electrically disconnected from each other. In this case, the vehicle 50 cannot be charged externally.

The HMI device 60 receives an operation from the user of the vehicle 50, and displays various screens. The HMI device 60 is operated to set an expected departure time of the vehicle 50, for example. The HMI device 60 may display a screen for inquiring the user whether the vehicle 50 can actually participate in a DR during a DR period specified in the DR signal S1. When a user operation that indicates whether the vehicle 50 is allowed to participate in the DR is performed in response to the inquiry, information that indicates the participation or not is stored in a memory of the ECU 200 as the participation-or-not information.

The communication device 62 is configured to communicate with a device that is external to the vehicle 50. The communication device 62 receives the DR signal S1 from the server 30, and transmits the vehicle information VI to the server 30, for example. The communication device 62 may be built in the ECU 200.

The start switch 65 is operated by the user in order to switch between start and stop of a travel system (power source system) of the vehicle 50.

The power storage device 110 is configured to store power for travel. The power storage device 110 is a secondary battery such as a lithium ion battery or a nickel hydrogen battery. The amount of power stored in the power storage device 110 is indicated by the SOC, for example.

The ECU 200 is a computer that includes a processor such as a CPU and a memory (neither illustrated). The ECU 200 controls various devices of the vehicle 50 such as the MG 51, the PCU 54, the SMR 55, the charge relay 58, the HMI device 60, and the communication device 62.

The ECU 200 is configured to control the open-close state of the SMR 55 and the open-close state of the charge relay 58, for example. The ECU 200 is further configured to calculate the SOC of the power storage device 110 in accordance with the temperature, the voltage, and the current of the power storage device 110.

For example, when the inlet 59 is connected to the EVSE 40 and start of charge is requested, the ECU 200 controls the charge relay 58 to the closed state, and transmits a signal that indicates a charge start request to the EVSE 40. When the charge start request is received, the EVSE 40 executes external charge by converting AC power from the power network PG into DC power and supplying the converted power to the vehicle 50. When the SOC of the power storage device 110 reaches a threshold value (e.g. an SOC set as a fully charged state) after external charge is started, the ECU 200 transmits a signal that indicates a charge stop request to the EVSE 40, and controls the charge relay 58 to the open state. Consequently, when the charge stop request is received, the EVSE 40 ends external charge by stopping supply of power to the vehicle 50.

In the present embodiment, the vehicle 50A is a V1G vehicle configured to be able to execute only external charge. On the other hand, the vehicle 50B is a V2G vehicle configured to be able to selectively execute external charge and external discharge. In the present embodiment, the vehicle 50A and the vehicle 50B both have the configuration as illustrated in FIG. 3. During external charge, power is supplied from the power network PG to the vehicle 50A via the EVSE 40A, and power is supplied from the power network PG to the vehicle 50B via the EVSE 40B. During power supply to the external, power is supplied from the vehicle 50B to the power network PG via the EVSE 40B. The vehicle 50B may be configured differently from the vehicle 50A in order to be able to execute power supply to the external.

Therefore, the amount of power demanded in the power network PG can be increased when external charge is executed in each of the vehicle 50A and the vehicle 50B, for example. On the other hand, the amount of power demanded in the power network PG can be decreased when power supply to the external is executed in the vehicle 50B, for example.

Consequently, it is possible to participate in a request for a DR requested from the server 30 when the charge relay 58 is brought into the closed state in order to execute external charge or power supply to the external.

When participating in a request for a DR, on the other hand, the number of times of switching the charge relay 58 from the disconnected state to the connected state (hereinafter referred to as "number of on times") is increased compared to when only a normal charge process or power supply process not based on a request for a DR is executed, which occasionally degrades the charge relay 58.

In a case in which operation to switch the charge relay 58 is prohibited when the number of on times is more than a threshold value, for example, however, an incentive may not be acquired since it is not possible to participate in a request for a DR thereafter, and the relay may be degraded as the number of on times is increased, which may result in trouble in which a normal charge process or power supply process cannot be executed etc.

Thus, in the present embodiment, when the number of on times of the charge relay 58 is more than an upper limit value when the power storage device 110 is charged by receiving power supplied from the power network PG in a target vehicle, among the vehicles 50, in accordance with a request for an increase DR, the target vehicle is instructed to maintain the charge relay 58 in the connected state until a charge process executed in accordance with the request for the increase DR is completed.

With this configuration, when a charge process is executed in accordance with a request for an increase DR, the charge relay 58 is maintained in the connected state until the charge process is completed. Therefore, it is possible to complete charge of the power storage device 110 and suppress an increase in the total number of on times. Consequently, it is possible to suppress degradation of the charge relay 58 when the target vehicle is used as a part of the VPP.

Figure 4:
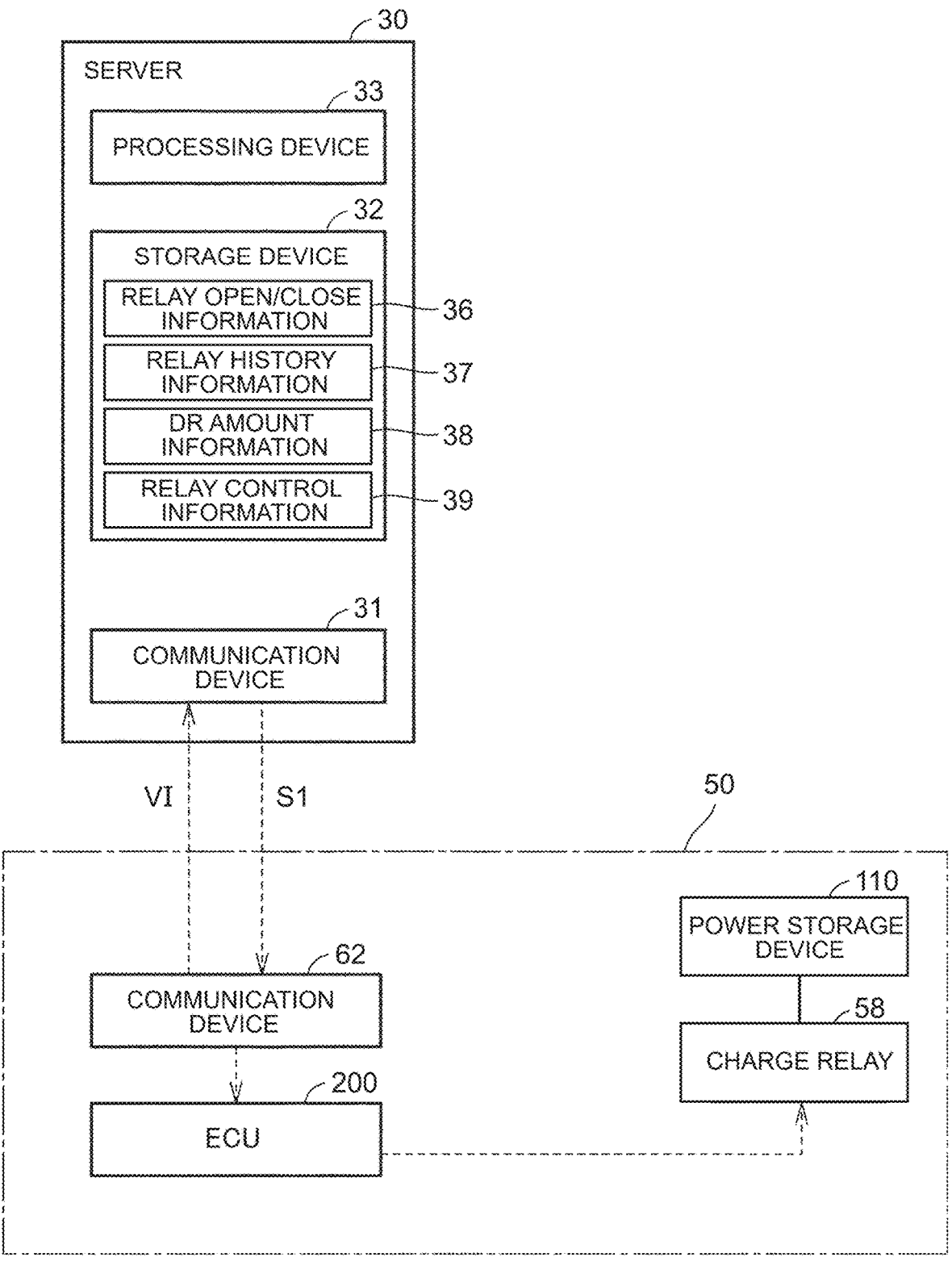
FIG. 4 illustrates a specific process executed by a processing device of a server and an ECU of the vehicle.

The process executed by each of the servers 30 and the vehicles 50 and information exchanged between the servers 30 and the vehicles 50 will be described below with reference to FIG. 4. FIG. 4 illustrates a specific process executed by the processing device 33 of the server 30 and the ECU 200 of the vehicle 50.

With reference to FIG. 4, the storage device 32 of the server 30 stores relay open-close information 36, relay history information 37, DR amount information 38, and relay control information 39 for each vehicle 50 in correspondence with the vehicle ID.

The relay open-close information 36 includes information that indicates whether the charge relay 58 of each of the vehicles 50 is in the open state or the closed state, for example. The relay history information 37 includes information that indicates the last continuation time for which the charge relay 58 of each of the vehicles 50 was in the closed state, and information that indicates the total number of on times of the charge relay 58. The DR amount information 38 includes information that indicates a DR request amount allocated to each of the vehicles 50. The total number of on times includes, for example, the number of times when the charge relay 58 is brought into the on state in accordance with a request for a DR made since the vehicle 50 was manufactured and the number of times when the charge relay 58 is brought into the on state through a normal charge process or power supply process not based on a request for a DR.

The relay control information 39 includes information related to control for the charge relay 58 of each of the vehicles 50. The information related to control for the charge relay 58 includes, for example, information that indicates the minimum continuation time for which the charge relay 58 is in the on state during a charge process executed in accordance with a DR request, and information related to limitation (such as prohibition of switching, for example) on control for the charge relay 58 during execution of a charge process executed in accordance with a DR request.

When a request signal R1 is received from the server 20, for example, the processing device 33 of the server 30 transmits a DR signal S1 to each of the vehicles 50.

When the DR signal S1 is received from the server 30 via the communication device 62, the ECU 200 of each vehicle 50 consecutively transmits the vehicle information VI to the server 30.

The processing device 33 of the server 30 updates the relay open-close information 36, the relay history information 37, and the DR amount information 38 using the received vehicle information VI. The processing device 33 of the server 30 updates the DR amount information 38 by specifying vehicles that can participate in a DR, among the vehicles 50, using the participation-or-not information and allocating a DR amount to the specified vehicles, for example. The processing device 33 of the server 30 allocates a DR amount in accordance with the SOC of the power storage device 110 mounted on the vehicles 50 that can participate in a DR, for example. The processing device 33 allocates the difference between the present SOC of the power storage device 110 and the SOC thereof corresponding to the fully charged state as the DR amount, for example.

The processing device 33 of the server 30 updates the relay control information 39 using the relay open-close information 36 and the relay history information 37 on each vehicle 50. When the number of on times of the charge relay 58 is more than an upper limit value for any of the vehicles 50, for example, the processing device 33 of the server 30 generates control information for maintaining the charge relay 58 in the on state (i.e. prohibiting switching to the off state) until a charge process executed in accordance with a request for an increase DR is completed, and updates the relay control information 39. The processing device 33 of the server 30 transmits the updated relay control information 39 to the target vehicle. In the vehicle 50 that has received the updated relay control information 39, when a charge process is executed in accordance with a request for an increase DR, the charge relay 58 is maintained in the on state until the charge process is completed. Therefore, the charge relay 58 is maintained in the on state even when the period of execution of the charge process includes a period for which charge is stopped.

Alternatively, the processing device 33 of the server 30 sets and updates the minimum continuation time using the relay open-close information 36 and the relay history information 37. The method of setting the minimum continuation time will be discussed later.

Figure 5:
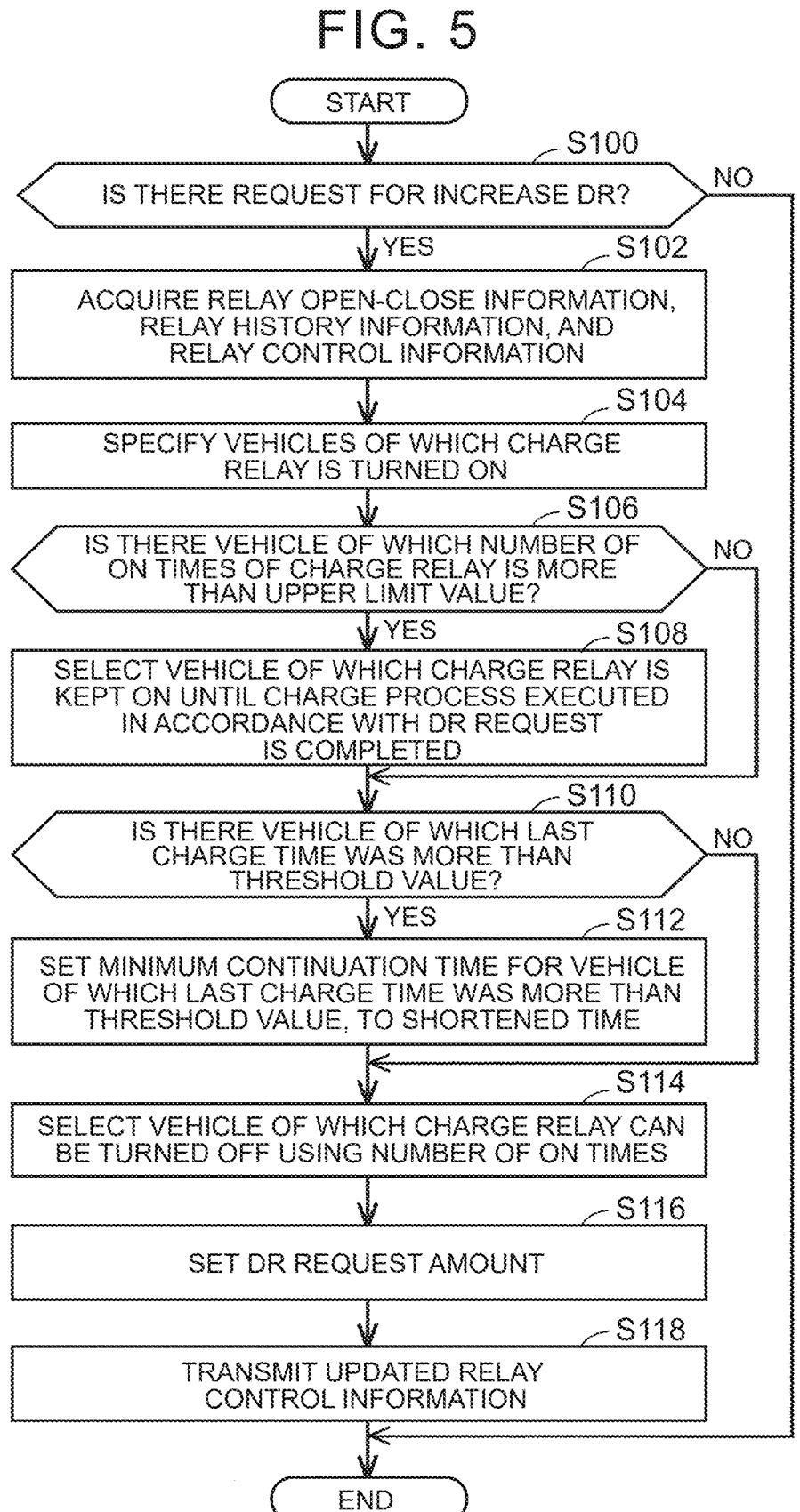
FIG. 5 is a flowchart illustrating an example of a process executed by the server of the power management system according to the present embodiment.

Next, an example of the process executed by the server 30 of the power management system 1 according to the present embodiment will be described. FIG. 5 is a flowchart illustrating an example of the process executed by the server 30 of the power management system 1 according to the present embodiment. A series of processes indicated in the flowchart is performed by the server 30 repeatedly in predetermined control cycles.

In step (hereinafter abbreviated as "S") 100, the server 30 determines whether there is a request for an increase DR. The server 30 determines that there is a request for an increase DR when a request signal R1 that includes a request for an increase DR has been received from the server 20, for example. A request for an increase DR is made when it is predicted that the amount of power that can be supplied in the power network PG is more than the amount of power demanded after the lapse of a time determined in advance, for example. When it is determined that there is a request for an increase DR (YES in S100), the process proceeds to S102.

In S102, the server 30 acquires relay open-close information, relay history information, and relay control information from the vehicles 50. The server 30, by transmitting a DR signal S1 to each of the vehicles 50, receives vehicle information VI from the vehicles 50, and updates information stored in the storage device 32 using the received information, for example. The server 30 acquires the relay open-close information, the relay history information, and the relay control information using the updated information. After that, the process proceeds to S104.

In S104, the server 30 specifies, among the vehicles 50, vehicles of which the charge relay 58 is brought into the on state in accordance with a request for an increase DR. The server 30 specifies vehicles of which the charge relay 58 is brought into the on state in accordance with a request for an increase DR, by acquiring the vehicle ID of vehicles of which the charge relay 58 is brought into the on state in accordance with a request for an increase DR, using participation-or-not information included in the vehicle information VI received from the vehicles 50, for example. After that, the process proceeds to S106.

In S106, the server 30 determines whether there is a vehicle of which the number of on times of the charge relay 58 is more than an upper limit value, among the specified vehicles 50. A value determined in advance may be set as the upper limit value, for example. When it is determined by the server 30 that there is a vehicle of which the number of on times of the charge relay 58 is more than the upper limit value, among the specified vehicles 50 (YES in S106), the process proceeds to S108. The upper limit value is an example of a first value.

In S108, the server 30 selects the vehicle which is determined that the number of on times of the charge relay 58 is more than the upper limit value, as a vehicle of which the charge relay 58 is maintained in the on state until a charge process executed in accordance with a request for an increase DR is completed. That is, the server 30 updates the relay control information corresponding to the vehicle ID of the vehicle which is determined that the number of on times of the charge relay 58 is more than the upper limit value, by adding, to such relay control information, control information for maintaining the charge relay 58 in the on state until the period of execution of a charge process executed in accordance with a request for an increase DR is ended when such a charge process is executed. After that, the process proceeds to S110. Also when there is no vehicle of which the number of on times of the charge relay 58 is more than the upper limit value, among the specified vehicles 50 (NO in S106), the process proceeds to S110.

In S110, the server 30 determines whether there is a vehicle of which the last charge time (the charge time executed most recent) was more than a threshold value, among the vehicles specified as vehicles of which the charge relay 58 is brought into the on state in accordance with a request for an increase DR. The threshold value is a value for determining that charge was executed for a long time in the last executed charge process, and may be a value determined in advance, for example. The server 30 may acquire information on the last charge time separately from the vehicle information VI or as information included in the vehicle information VI from the vehicle 50, or may acquire the last continuation time of the on state of the charge relay 58 as the last charge time, for example. When it is determined that there is a vehicle of which the last charge time was more than the threshold value, among the specified vehicles (YES in S110), the process proceeds to $112.

In S112, the server 30 sets the minimum continuation time for the charge relay 58 corresponding to the vehicle of which the last charge time was more than a threshold value (third value), to a time shortened by a time determined in advance. The server 30 updates the relay control information using the set minimum continuation time. An initial value of the minimum continuation time may be a value determined in advance, for example. After that, the process proceeds to S114. Also when it is determined that there is no vehicle of which the last charge time was more than the threshold value (NO in S110), the process proceeds to S114.

In S114, the server 30 selects a vehicle of which the charge relay 58 can be (is allowed to be) turned off during the period of execution of a charge process executed in accordance with a request of an increase DR using the number of on times of the charge relay 58. The server 30 selects, among the vehicles 50 specified in S104, a vehicle 50 of which the number of on times of the charge relay 58 is less than a threshold value, as the vehicle of which the charge relay 58 can be turned off during the period of execution of a charge process executed in accordance with a request for an increase DR, for example.

In S116, the server 30 adjusts the DR request amount for each vehicle that participates in a request for an increase DR. When there is a vehicle that cannot achieve the initially allocated DR request amount due to the setting of vehicles of which the charge relay 58 is maintained in the on state during the period of execution of a charge process, vehicles of which the minimum continuation time has been shortened, and vehicles of which the charge relay 58 can be brought into the off state during the period of execution of a charge process, the server 30 changes the DR request amount for the vehicle that cannot achieve the initially allocated DR request amount to a DR request amount that can be achieved by the vehicle, and allocates a shortage that results from the change to the other vehicles, for example. The other vehicles may be one vehicle, or may be a plurality of vehicles. The server 30 does not make an adjustment when all the vehicles can achieve the initially allocated DR request amount. After that, the process proceeds to S118.

In S118, the server 30 transmits the updated relay control information to each vehicle 50. The vehicle 50 that received the updated relay control information controls the charge relay 58 using the updated relay control information when the vehicle 50 participates in a request for an increase DR.

Operation of the power management system 1 according to the present embodiment based on the structure and the flowchart described above will be described.

When the amount of power that can be supplied by the power company E1 is more than, or is predicted to become more than, the amount of power demanded, for example, a request for an increase DR for increasing the amount of power demanded is made to the higher-level aggregator E2. When a request for an increase DR is received from the power company E1, the higher-level aggregator E2 transmits a request signal R1 including a request for an increase DR to the Jower-level aggregator E3.

At the servers 30 of the lower-level aggregator E3, when a request for an increase DR is included in the request signal R1 (YES in S100), a DR signal S1 is transmitted to the vehicles 50 included in the vehicle group 5 so that relay open-close information, relay history information, and relay control information are acquired from the vehicles 50 (S102).

Vehicles of which the charge relay 58 is brought into the on state in accordance with the request for a DR, are specified using participation-or-not information included in the acquired vehicle information VI (S104). Further, it is determined whether there is a vehicle of which the number of on times of the charge relay 58 is more than an upper limit value, among the specified vehicles (S106).

When there is a vehicle of which the number of on times of the charge relay 58 is more than the upper limit value, the vehicle is selected as a vehicle of which the charge relay 58 is maintained in the on state until a charge process executed in accordance with the DR request is completed (S108).

Further, it is determined whether there is a vehicle of which the last charge time was more than a threshold value, among the specified vehicles (S110). When there is a vehicle of which the last charge time was more than the threshold value, the minimum continuation time for the vehicle is set to be shortened by a time determined in advance (S112). Further, a vehicle of which the charge relay 58 can be turned off during the period of execution of a charge process executed in accordance with a request for the DR, is selected using the number of on times of the charge relay 58, from among the specified vehicles (S114).

Then, the DR request amount for each of the specified vehicles 50 is set (S116), and the updated relay control information is transmitted to each vehicle 50 (S118).

Each vehicle 50, to which a DR request amount has been allocated, is charged externally. When the vehicle is selected as a vehicle of which the charge relay 58 is maintained in the on state, the charge relay 58 is maintained in the on state until the period of execution of a charge process in a DR request time zone elapses, even if the period of execution includes a period for which charge is suspended. Therefore, an increase in the number of on times of the charge relay 58 is suppressed.

For a vehicle of which the last charge time was more than a threshold value, further, the minimum continuation time is shortened, and thus operation to open and close the charge relay 58 is performed responsively in response to variations in the DR request amount. In particular, the amount of power demanded is adjusted through operation to open and close the charge relay 58 of a vehicle of which the number of on times is small for variations in the DR request amount, and therefore the occurrence of deviation in which the number of on times of the charge relay 58 is increased for some of the vehicles 50 is suppressed.

As described above, with the power management system 1 according to the present embodiment, the charge relay 58 is maintained in the connected state until a charge process is completed when the charge process is executed in accordance with a request to increase the amount of power demanded. The charge relay 58 is maintained in the on state even when the period of execution of a charge process executed in accordance with a request for an increase DR includes a period for which charge of the power storage device 110 is suspended. Therefore, it is possible to complete charge of the power storage device 110 and suppress an increase in the total number of on times. Consequently, it is possible to suppress degradation of the charge relay 58 when the target vehicle is used as a part of the VPP. Thus, it is possible to provide a power management system that suppresses an increase in the number of times of switching of the relay for switching the state of connection between the power network and the in-vehicle power storage device.

Further, the charge relay 58 is controlled such that a continuation time in which the charge relay 58 is continuously in the connected state does not fall below the minimum continuation time (a second value) during execution of a charge process executed in accordance with a request for an increase DR, and thus it is possible to suppress the charge relay 58 being turned on and off at intervals shorter than the minimum continuation time. Therefore, it is possible to suppress an increase in the total number of on times of the relay.

When the last charge time was more than a threshold value, the minimum continuation time is set to be shorter than when the last charge time was less than the threshold value, and thus a charge process can be stopped responsively in response to a DR request.

Modifications will be described below.

In the embodiment discussed above, the upper limit value of the number of on times and the initial value of the minimum continuation time are values determined in advance. However, at least either of the upper limit value of the number of on times and the minimum continuation time in the on state may be set using charge power from the EVSE 40 connected to each vehicle 50, for example. The server 30 acquires information about charge power of the EVSE 40 when vehicle information VI is acquired from each vehicle 50, for example. The server 30 sets the upper limit value and the minimum continuation time corresponding to each vehicle 50 using the acquired charge power. The server 30 may set the upper limit value and the minimum continuation time using a map, a table, a formula, a function, etc. that indicates the relationship between the charge power and the upper limit value and the minimum continuation time and the acquired charge power, for example. The relationship between the charge power and the upper limit value and the minimum continuation time may be determined such that a smaller upper limit value or a longer minimum continuation time is set as the charge power becomes higher, since a higher load is imposed on the relay by single switching to the on state, for example.

Figure 6:
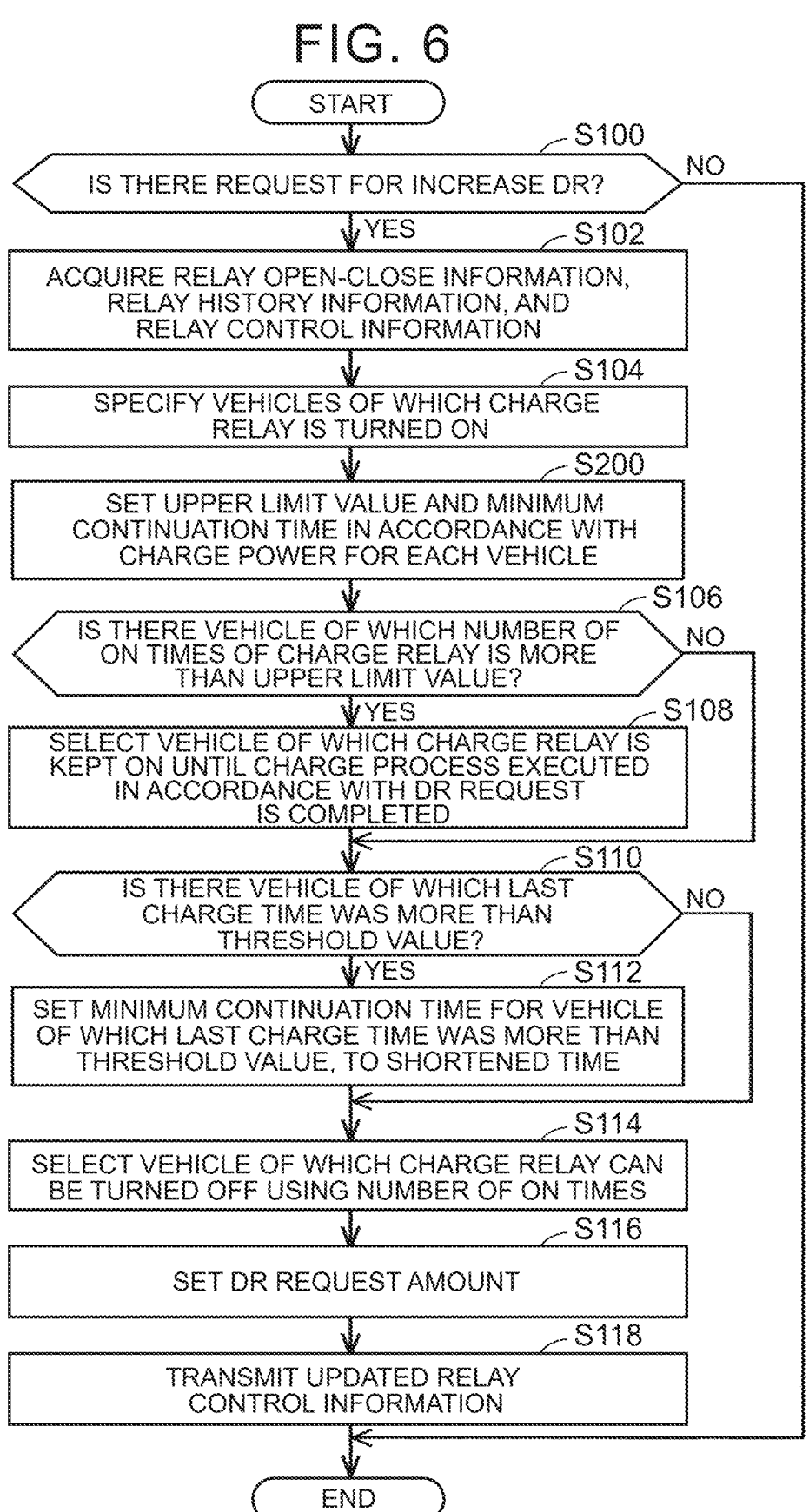
FIG. 6 is a flowchart illustrating an example of a process executed by a server of a power management system according to a modification.

FIG. 6 is a flowchart illustrating an example of a process executed by a server 30 of a power management system 1 according to a modification. The flowchart illustrated in FIG. 6 is different from the flowchart illustrated in FIG. 5 in further including the process in S200. The other processes in FIG. 6 are the same in content as the processes described in relation to FIG. 5 except for those to be described below, and are given the same step numbers. Therefore, the detailed description of such processes will not be repeated.

After vehicles of which the charge relay is brought into the on state, are specified (S104), the process proceeds to S200.

In S200, the server 30 sets an upper limit value of the number of on times and a minimum continuation time in accordance with charge power for each of the specified vehicles 50. The method of acquiring charge power for each vehicle 50 and the method of setting an upper limit value of the number of on times and a minimum continuation time are as discussed above, and therefore the detailed description thereof will not be repeated.

With this configuration, an upper limit value and a minimum continuation time that match charge power from the EVSE 40 are set, and thus it is possible to stop a charge process responsively in response to a request while suppressing an increase in the total number of on times of the relay. While both an upper limit value and a minimum continuation time are set using charge power in the flowchart in FIG. 6 by way of example, either of an upper limit value and a minimum continuation time may be set.

In the embodiment discussed above, further, a vehicle of which the charge relay 58 can be turned off, is selected using the number of on times of the charge relay 58, and variations in the DR request amount are handled using the selected vehicle. When the amount of power demanded is adjusted in accordance with a request for an increase DR, however, the amount of power demanded may be adjusted using a reserve determined in advance for vehicles of which the number of on times of the charge relay 58 is more than a threshold value (<upper limit value). The reserve determined in advance is a reserve with a reaction time determined in advance, and more specifically includes a reserve, among a plurality of reserves with different reaction times for adjusting the amount of power demanded in accordance with a request for a DR, with a reaction time that is longer than that of any other reserves.

In the embodiment discussed above, further, a vehicle of which the charge relay 58 can be turned off, is selected using the number of on times of the charge relay 58, and variations in the DR request amount are handled using the selected vehicle. When the amount of power demanded is adjusted in accordance with a request for an increase DR, however, a V1G vehicle of which the magnitude of the difference between the charge power and the last charge power is equal to or less than a threshold value, may be selected as the vehicle of which the charge relay 58 is maintained in the on state until a charge process is completed.

Figure 7:
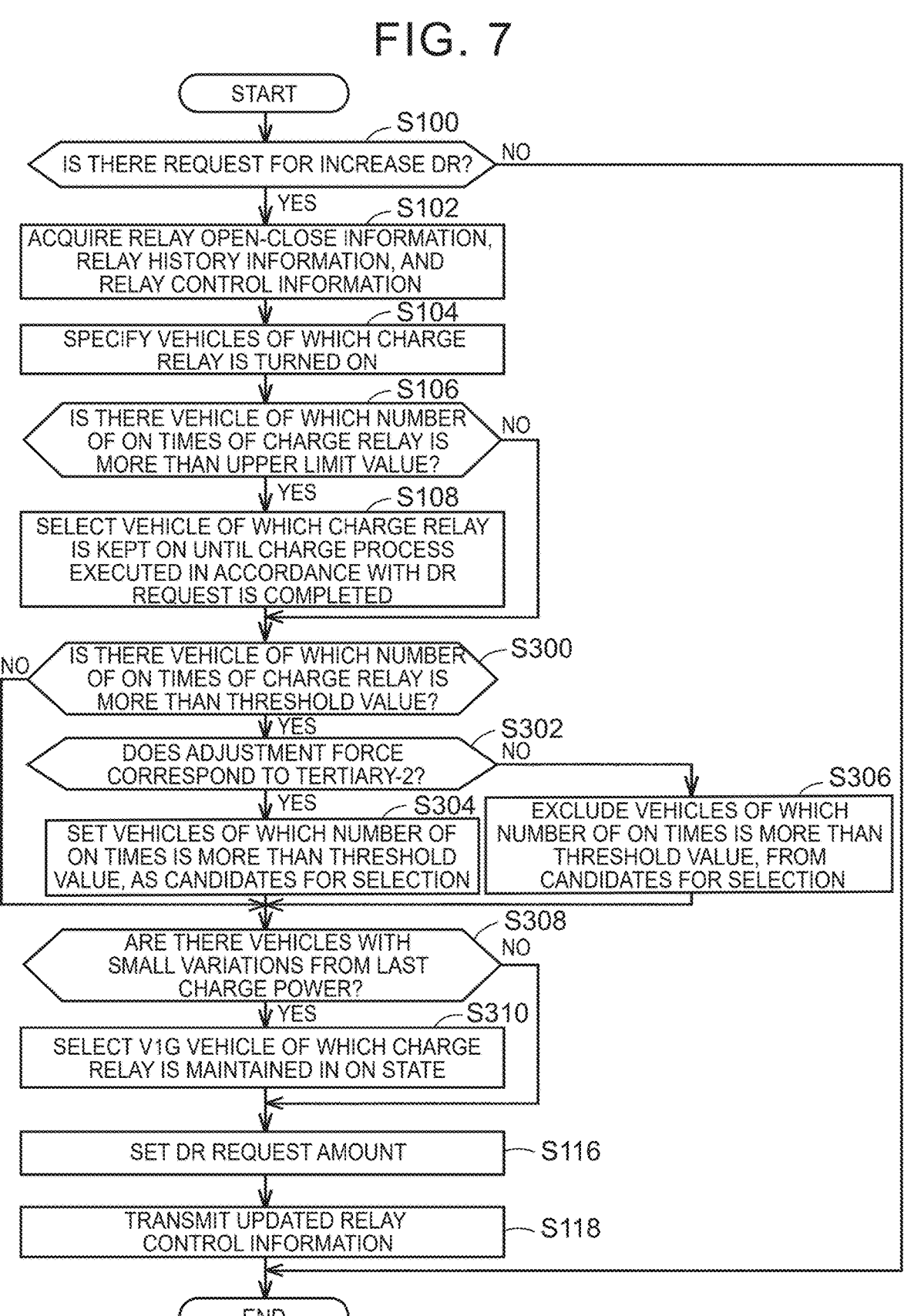
FIG. 7 is a flowchart illustrating another example of a process executed by a server of a power management system according to a modification.

FIG. 7 is a flowchart illustrating another example of a process executed by a server 30 of a power management system 1 according to a modification. A series of processes indicated in the flowchart is executed by the server 30 repeatedly in predetermined control cycles.

The flowchart illustrated in FIG. 7 is different from the flowchart illustrated in FIG. 5 in further including the processes in S300, S302, S304, S306, S308, and S310 in place of the processes in S110, S112, and S114. The other processes in FIG. 7 are the same in content as the processes described in relation to FIG. 5 except for those to be described below, and are given the same step numbers. Therefore, the detailed description of such processes will not be repeated.

When there is no vehicle of which the number of on times of the charge relay 58 is more than the upper limit value (NO in S106), or after a vehicle of which the charge relay 58 is maintained in the on state until a charge process is completed in accordance with a request for an increase DR, is selected (S108), the process proceeds to S300.

In S300, the server 30 determines whether there is a vehicle of which the number of on times of the charge relay 58 is more than a threshold value. It is only necessary that the threshold value should be a value that is less than the upper limit value and that allows determining a vehicle of which the number of on times of the charge relay 58 is relatively large, from among the vehicles 50, and the threshold value is not specifically limited. When it is determined that there is a vehicle of which the number of on times of the charge relay 58 is more than the threshold value (YES in S300), the process proceeds to S302.

In S302, the server 30 determines whether the reserve for adjusting the amount of power demanded in accordance with a request for an increase DR is a reserve corresponding to "tertiary-2".

The reserve for adjusting the amount of power demanded includes a plurality of reserves determined in advance with different reaction times. For example, the reserve includes a primary reserve, a secondary reserve, a tertiary reserve (1) (hereinafter referred to as "tertiary-1"), and a tertiary reserve (2) (hereinafter referred to as "tertiary-2"). Different reaction times are set for these reserve. For example, the primary reserve has a reaction time of 10 seconds or less, the secondary reserve has a reaction time of 5 minutes or less, the tertiary-1 has a reaction time of 15 minutes or less, and the tertiary-2 has a reaction time of 45 minutes or less. That is, the tertiary-2 is a reserve that has a reaction time that is longer than the reaction time of any other reserve. The server 30 sets a reserve for the amount of power demanded in accordance with a request for an increase DR in response to a request on a reserve from the server 20, and stores information (reserve information) on the set reserve in the storage device 32, for example. The server 30 determines whether the reserve for adjusting the amount of power demanded in accordance with a DR request using the reserve information is a reserve corresponding to the tertiary-2. The reserve may be set in advance for each area under the responsibility of the server 30, for example. In the present modification, the respective reserve of the vehicles 50 are the same reserve, by way of example. However, different reserve may be set for the vehicles 50, for example. When it is determined that the reserve for adjusting the amount of power demanded in accordance with a DR request is a reserve corresponding to the tertiary-2 (YES in S302), the process proceeds to S304.

In S304, the server 30 sets vehicles of which the number of on times of the charge relay 58 is more than a threshold value, as candidates for selection (targets for participation in a request for an increase DR). After that, the process proceeds to S308. When it is determined that the reserve for adjusting the amount of power demanded in accordance with a request for an increase DR is not a reserve corresponding to the tertiary-2 (NO in S302), the process proceeds to S306.

In S306, the server 30 excludes vehicles of which the number of on times of the charge relay 58 is more than threshold value, from the candidates for selection. The server 30 may update the participation-or-not information corresponding to the vehicle ID of the vehicle to information that indicates non-participation, for example. After that, the process proceeds to S308.

In S308, the server 30 determines whether there are vehicles with small variations from the last charge power. The server 30 determines that there are vehicles with small variations from the last charge power when there are vehicles of which the magnitude of the difference between the last charge power and the current charge power is a threshold value or less, among the vehicles 50. When it is determined that there are vehicles with small variations from the last charge power (YES in S308), the process proceeds to S310.

In S310, the server 30 selects a V1G vehicle, among the vehicles with small variations from the last charge power, as a vehicle of which the charge relay 58 is maintained in the on state until a charge process executed in accordance with a request for an increase DR is completed. After that, the process proceeds to S116. Also when it is determined that there are no vehicles with small variations from the last charge power (NO in S308), the process proceeds to S116.

Operation of the power management system 1 according to the present modification based on the flowchart described above will be described.

A case where the higher-level aggregator E2 receives a request for an increase DR from the power company E1 and a request signal R1 that includes a request for an increase DR is transmitted to the lower-level aggregator E3 is assumed, for example. The request signal R1 includes information demanding that the reserve for the amount of power demanded using the vehicle group 5 should be the tertiary-2.

At the servers 30 of the lower-level aggregator E3 (YES in S100), when a request for an increase DR is included in the request signal R1, a DR signal S1 is transmitted to the vehicles 50 included in the vehicle group 5 so that relay open-close information, relay history information, and relay control information are acquired from the vehicles 50 (S102).

Vehicles of which the charge relay 58 are brought into the on state in accordance with the request for a DR, are specified using participation-or-not information included in the acquired vehicle information VI (S104). Further, it is determined whether there is a vehicle of which the number of on times of the charge relay 58 is more than an upper limit value, among the specified vehicles (S106).

When there is a vehicle of which the number of on times of the charge relay 58 is more than the upper limit value (YES in S106), the vehicle is selected as a vehicle of which the charge relay 58 is maintained in the on state until a charge process executed in accordance with the request for the increase DR is completed (S108).

When there is a vehicle of which the number of on times of the charge relay 58 is more than a threshold value (<upper limit value), and when the reserve is the tertiary-2 (YES in S302), further, the vehicle is also set as candidates for selection (S304) on a vehicle 50 of which the number of on times is more than the threshold value.

When there are vehicles with small variations from the last charge power (YES in S308), if it is a V1G vehicle, the vehicle is selected as a vehicle of which the charge relay 58 is maintained in the on state until a charge process executed in accordance with a request for an increase DR is completed, even if the number of on times is not more than the upper limit value (S310).

Then, a DR request amount is set for each of the specified vehicles 50 (S116), and the updated relay control information is transmitted to each vehicle 50 (S118).

Each vehicle 50, to which a DR request amount has been allocated, is charged externally. When the vehicle is selected as a vehicle of which the charge relay 58 is maintained in the on state, the charge relay 58 is maintained in the on state until the period of execution of a charge process in a DR request time zone elapses. Therefore, an increase in the number of on times of the charge relay 58 is suppressed.

The amount of power demanded is adjusted through operation to open and close the charge relay 58 of vehicles of which the number of on times is small for variations in the DR request amount, and V2G vehicles, and therefore can be adjusted to an amount of power demanded that conforms to the DR request amount. It is assumed that V1G vehicles are only charged externally, and therefore the V1G vehicles occasionally use a relay that is less durable (with a smaller upper limit value of the number of on times) than that for the V2G vehicles that can execute both external charge and power supply to the external. Therefore, the occurrence of deviation in the number of on times of the charge relay 58 among all the vehicles 50 is suppressed by suppressing an increase in the number of on times of the charge relay 58 in the V1G vehicles.

With this modification, when the amount of power demanded is adjusted using a reserve with a long reaction time, the frequency at which the charge relay 58 is turned on is occasionally lower than when the amount of power demanded is adjusted using a reserve with a short reaction time. Therefore, it is possible to suppress an increase in the total number of on times of the charge relay 58 of the vehicle 50 by selecting a vehicle of which the number of on times is more than a threshold value (a fourth value), as a vehicle of which the amount of power demanded is adjusted using the tertiary-2.

In vehicles with small variations from the last charge power, it is possible to suppress an increase in the total number of on times of the charge relay 58, since the charge relay 58 is maintained in the connected state for the period of execution of a charge process executed in accordance with a request for an increase DR.

In the embodiment discussed above, only the charge relay 58 is provided between the power storage device 110 and the inlet 59. However, the SMR 55 and the charge relay 58 may be provided between the power storage device 110 and the inlet 59.

Figure 8:
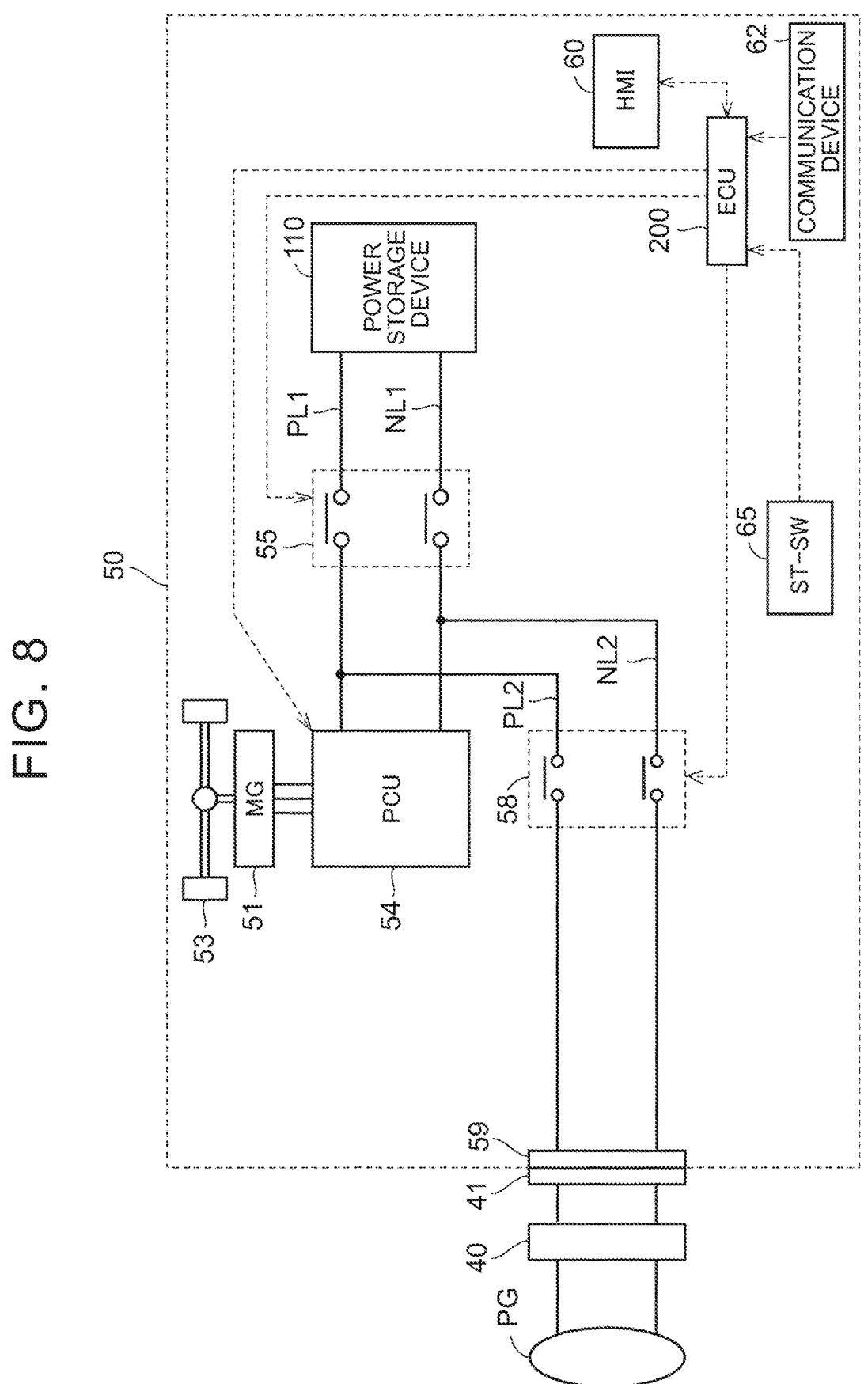
FIG. 8 illustrates an example of a detailed configuration of a vehicle according to a modification.

FIG. 8 illustrates an example of a detailed configuration of a vehicle according to a modification. The vehicle 50 illustrated in FIG. 8 is different from the vehicle 50 illustrated in FIG. 3 in that the position of connection of one end of the power line PL2 is a position on the power line PL1 between the PCU 54 and the SMR 55, and that the position of connection of one end of the power line NL2 is a position on the power line NL1 between the PCU 54 and the SMR 55. The other components of the vehicle 50 illustrated in FIG. 8 are the same as the components of the vehicle 50 illustrated in FIG. 3, and are denoted by same reference signs. Therefore, the detailed description thereof will not be repeated.

The vehicle 50 illustrated in FIG. 8 is different from the vehicle 50 illustrated in FIG. 3 in that the SMR 55 is brought into the closed state, in addition to bringing the charge relay 58 into the closed state, when the vehicle 50 is charged externally. In this case, the server 30 determines whether there is a vehicle of which the larger one of the number of on times of the charge relay 58 and the number of on times of the SMR 55 is more than an upper limit value, among the vehicles 50. Also with this configuration, it is possible to suppress an increase in the number of on times of the charge relay 58 or the SMR 55.

In the embodiment discussed above, further, when the number of on times of the charge relay 58 is more than an upper limit value when the power storage device 110 is charged by receiving power supplied from the power network PG in a target vehicle, among the vehicles 50, in accordance with a request for an increase DR, the target vehicle is instructed to maintain the charge relay 58 in the connected state until a charge process executed in accordance with the request for an increase DR is completed. However, the request for a DR is not limited to a request for an increase DR, and may be a request for a reduction DR. For example, any of the vehicles 50 occasionally follows a request for a reduction DR by reducing the amount of charge. Therefore, also when a request for a reduction DR is followed, a power storage device 110 is occasionally charged by receiving power supplied from the power network PG in a target vehicle, among the vehicles 50. Therefore, when the number of on times of the charge relay 58 is more than the upper limit value, the target vehicle is instructed to maintain the charge relay 58 in the connected state until a charge process executed in accordance with a request for a reduction DR is completed, which makes it possible to suppress an increase in the total number of on times of the charge relay 58.

All or a part of the modifications described above may be combined as appropriate to be implemented.

The embodiment disclosed herein should be considered to be illustrative and not restrictive in all respects. The scope of the present disclosure is indicated by the claims, rather than the above description, and is intended to include all modifications within the meaning and the scope equivalent to the claims.

What is claimed is:

1. A power management system that manages power transmitted between a virtual power plant connected to a power network installed in a predetermined area and the power network, the virtual power plant including a plurality of vehicles each of which is configured to be connectable to and disconnectable from the power network via a relay, a power storage device that is chargeable by receiving the power supplied from the power network being mounted on each of the plurality of vehicles, the power management system comprising a server that is able to communicate with the vehicles, wherein the server acquires a state of the relay of each of the vehicles, and when number of on times that the relay is brought from a disconnected state to a connected state is more than a first value in a case that the power storage device is charged by receiving the power supplied from the power network in a target vehicle, among the vehicles, in accordance with a request for an increase in an amount of the power demanded in the power network, the server instructs the target vehicle to maintain the relay in the connected state until a charge process executed in accordance with the request is completed.

2. The power management system according to claim 1, wherein a period in which the charge process is executed includes a period in which charge of the power storage device is suspended.

3. The power management system according to claim 1, wherein each of the vehicles includes a control device that controls the relay such that a continuation time, in which the relay is continuously kept in the connected state during execution of the charge process, is not less than a second value.

4. The power management system according to claim 3, wherein when a last charge time is more than a third value, the control device sets the second value to be a value less than the second value when the last charge time is less than the third value.

5. The power management system according to claim 3, wherein the server sets at least one of the first value and the second value using charge power in the charge process.

6. The power management system according to claim 1, wherein:

the server selects, among the vehicles, a vehicle of which the number of on times is more than a fourth value, as a vehicle that adjusts the amount of power demanded using a reserve determined in advance; and the reserve determined in advance includes a reserve, among a plurality of reserves with different reaction times for adjusting the amount of the power demanded in accordance with the request, with a reaction time being longer than any other of the different reaction times.

7. The power management system according to claim 1, wherein the server selects, among the vehicles, a vehicle that is allowed to bring the relay into the disconnected state during a period in which the charge process is executed, using the number of on times.

8. The power management system according to claim 1, wherein the server selects a vehicle in which a magnitude of a difference between charge power in the charge process and last charge power is equal to or less than a threshold value, as a vehicle of which the relay is maintained in the connected state until the charge process is completed.

9. The power management system according to claim 8, wherein:

the vehicles include one or more V1G vehicles that unilaterally receive power supplied from the power network; and the server selects a V1G vehicle in which the magnitude of the difference between the charge power in the charge process and the last charge power is equal to or less than the threshold value, as a vehicle of which the relay is maintained in the connected state until the charge process is completed.

* * * * *